US007420959B1

(12) United States Patent
Watanabe et al.

(10) Patent No.: US 7,420,959 B1
(45) Date of Patent: Sep. 2, 2008

(54) TELEPHONE APPARATUS USED FOR COMPUTER NETWORK TELEPHONE SYSTEM

(75) Inventors: Hidekazu Watanabe, Chiba (JP); Akimasa Oyama, Tokyo (JP); Masahiro Asai, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 08/764,394

(22) Filed: Dec. 11, 1996

(30) Foreign Application Priority Data

Dec. 18, 1995 (JP) .................................. P7-348401

(51) Int. Cl.
*H04L 12/66* (2006.01)
*H04J 3/04* (2006.01)
*G06F 15/16* (2006.01)
*G06F 15/177* (2006.01)

(52) U.S. Cl. .................. 370/352; 370/535; 709/219

(58) Field of Classification Search ............ 370/352, 370/355, 400, 401, 535, 536, 537, 354, 356, 370/419, 420, 389; 375/222; 395/200.15, 395/200.16; 709/219, 220
See application file for complete search history.

(56) References Cited

U.S. PATENT DOCUMENTS

| 4,740,963 | A | * | 4/1988 | Eckley ..................... 370/522 |
| 5,598,536 | A | * | 1/1997 | Slaughter et al. ....... 395/200.16 |
| 5,604,737 | A | * | 2/1997 | Iwami et al. ................ 370/352 |

* cited by examiner

*Primary Examiner*—Chi H. Pham
*Assistant Examiner*—Steven Nguyen
(74) *Attorney, Agent, or Firm*—Lerner, David, Littenberg, Krumholz & Mentlik, LLP

(57) ABSTRACT

A telephone apparatus connectable to a computer network through a telephone network to transmit data including audio signals via a server of said computer network includes: a first telephone set including a first audio input/output means for converting input voice into a digital audio signal and for converting a digital audio signal into output voice, and a first CPU that executes process for connecting the first telephone set to the server and process for compressing or expanding the digital audio signal; a second telephone set including a second audio input/output means for converting input voice into a digital audio signal and for converting a digital audio signal into output voice, and a second CPU that executes process for connecting the first telephone set to the server and process for compressing or expanding the digital audio signal; and connection control means connected between the telephone network and the first and second CPUs to enable the first and second CPUs to transmit the data.

2 Claims, 10 Drawing Sheets (PRIOR ART)

(PRIOR ART)

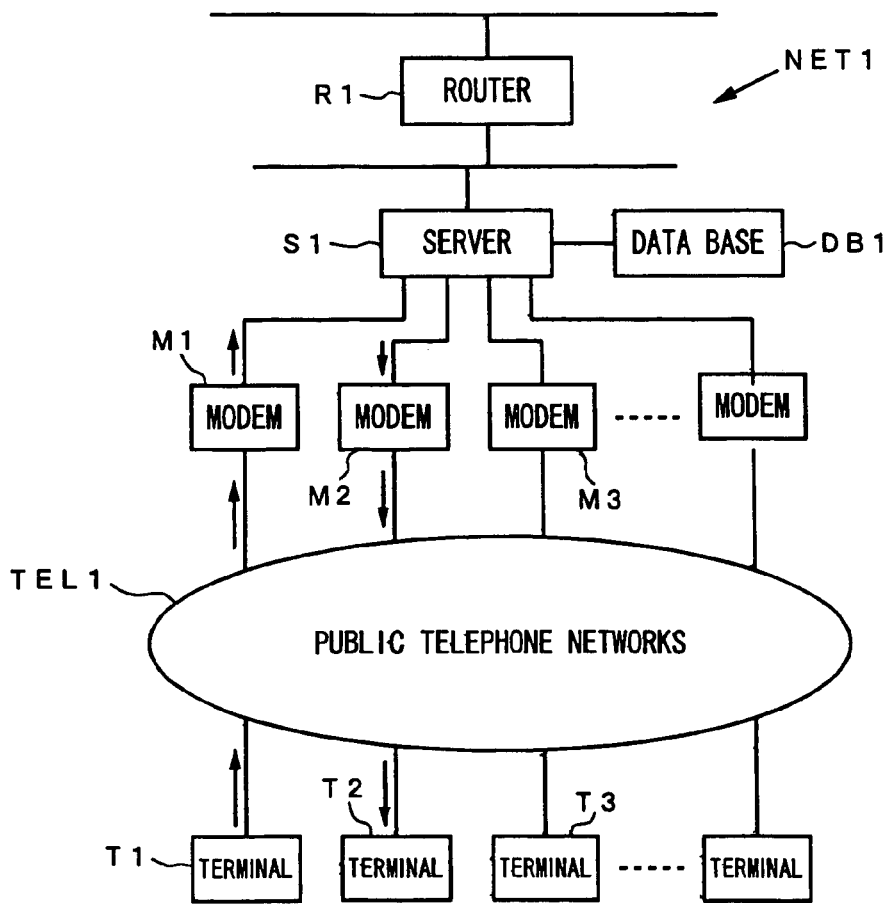

| PREAMBLE | AUDIO DATA | POSTAMBLE |

TELEPHONE APPARATUS USED FOR COMPUTER NETWORK TELEPHONE SYSTEM

BACKGROUND OF THE INVENTION

1. Field of the Invention

This invention relates to a telephone system suitable for use as an internet telephone for exchanging audio data through the internet that is a worldwide computer network system.

2. Related Art

The internet is a worldwide computer network system connecting computer networks in corporations or universities beyond countries. Increasingly provided are various services using the internet, such as e-mail service, file transfer service, and information search service.

FIG. 1 schematically shows a general aspect of the internet. In FIG. 1, each of computer networks NET101, NET102, NET103, . . . has a plurality of terminals T which are connected together by LAN (Local Area Network) in form of Ethernet or a token ring.

These computer networks NET101, NET102, NET103, . . . are connected together through routers R101, R102, R103, . . . that route data from one computer network to another, depending on the destination of the data.

Computer networks NET101, NET102, NET103, . . . connected through the routers R101, R102, R103, . . . form a computer network system. The computer network system is called internet. The internet enables exchanges of data among computer networks NET101, NET102, NET103, . . . .

The internet uses IP (Internet Protocol) as the protocol of its network layer. IP assigns an IP address to each terminal to identify a destination terminal of data. Each IP address is made up of four numerals each of which can be expressed by decimal 8 bits, such as 43.3.25.246.

As the internet is extended, the number of IP addresses possibly becomes insufficient. In some networks in which a large number of terminals are registered but only a small number of terminals are connected simultaneously, for example, it is possible to use a server on the network to allot currently available IP addresses to actually connected terminals alone in order to minimize the number of IP addresses used. In this manner, the network need not prepare IP addresses in the number corresponding to its terminals, but can effectively use a limited number of IP addresses.

The internet uses TCP (Transmission Control Protocol) and UDP (User Datagram Protocol) as protocols of its transport layer. TCP permits communication after establishing a connection-type transmission connection, and deals with packet sequence control, re-transmission, flow control and congestion control. UDP is a connectionless-type protocol that is used in lieu of TCP in networks requiring real-time transmission. In digital audio transmission, for example, re-transmission is not requested even when a part of the packets drops, but audio data is sent successively. In such audio transmission, UDP is used.

Thus, the internet basically uses TCP/IP protocol. That is, IP addresses are assigned to terminals of a computer network to identify individual terminals, and packets are transferred by TCP or UDP.

However, personal computers are not always connected by LAN, and there are some without IP addresses. Therefore, some individuals participating the internet use internet service providers. Through internet service providers, personal computers can be connected to computer networks and can participate the internet by, for example, PPP (Point to Point Protocol) or SLIP (Serial Line IP) through telephone lines.

FIG. 2 shows a construction of an internet service provider. The computer network NET151 of the internet service provider includes a server S151 and a router R151. The server S151 is connected to a public telephone line network TEL151 via modems M151, M152, M153, . . . .

Terminals T151, T152, T153, . . . are those of individuals personally participating the internet. Terminals T151, T152, T153, . . . are connected to the public telephone line network TEL151 through modems (not shown). Individual terminals T151, T152, T153, . . . may be personal computers having serial ports.

For participation in the internet through an internet service provider, users previously make a contract with an internet service provider in most cases. When a contract is concluded between a user and an internet service provider, an account code and a password are sent to the user.

When an individual participates in the internet from one of the terminals T151, T152, T153, . . . , the user dials into the internet service provider to call up the server S151 of the computer network NET151 of the provider. The server S151 responsively requests entry of the account code and the password for authentication whether the user is a contractor. When the server S151 authenticates that the entered account code and password are those of a contractor, it searches for an available IP address. If there is any IP address available, it temporarily assigns it to the terminal T151, T152, T153, or any other. Thus, the terminal obtaining the temporary IP address can connect to the internet.

In the above example, terminals are connected by PPP using telephone lines. However, ISDN (Integrated Service Digital Network) may be used alternatively. ISDN 64 includes three channels, namely, two B channels of 64 kbps and one D channel of 16 kbps. When ISDN is used, it can be used as a line of 64 kbps by sending IP packets on the B channels.

Internet telephones for effecting telephone communication using the internet are now being developed. Since the internet is basically free of charge, what is to be paid by the user for internet telephone communication through the internet is the charge based on the contract with the internet service provider and the charge for the call between the user and the internet service provider or the charge for the use of ISDN. Thus, users can enjoy long-distance telephone calls and international telephone calls very economically.

As explained above, individual terminals normally participate the internet by using a telephone circuit by PPP under a contract with a provider. When a mode is used, the maximum data rate is currently 28.8 kbps. As to audio data, however, data transfer rate ranges from 8 kbps to 64 kbps, depending on compression systems, and a data rate around 14.4 kbps is sufficient practically. Therefore, even when a telephone circuit is used, higher data transfer rates are acceptable. If a digital circuit such as ISDN is used, higher transmission rates are acceptable.

Taking it into account, telephone calls of two different routes using a single telephone line will be possible. If telephone calls of two routes using a single line is possible, the apparatus can be used conveniently also for telephone communication by three persons, interrupt calls and delivery of a call from a telephone set to another.

OBJECTS AND SUMMARY OF THE INVENTION

It is therefore an object of the invention to provide a terminal apparatus of a telephone system, which enables a plurality of telephone calls using a telephone line efficiently, and enables conversation by three persons, interrupt calls and delivery of a call from a telephone set to another.

Another object of the invention is to provide a terminal apparatus of a telephone system, which enables a plurality of telephone calls using a single telephone line without assigning a plurality of IP addresses to the single telephone line.

According to the invention, there is provide a telephone apparatus connectable to a computer network through a telephone circuit to transmit data including audio signals via a server of said computer network includes: a first telephone set including a first audio input/output means for converting input voice into a digital audio signal and for converting a digital audio signal into output voice, and a first CPU that executes processing for connecting the first telephone set to the server and processing for compression and expansion of the digital audio signal; a second telephone set including a second audio input/output means for converting input voice into a digital audio signal and for converting a digital audio signal into output voice, and a second CPU that executes processing for connecting the first telephone set to the server and processing for compression or expansion of the digital audio signal; and connection control means connected between the telephone circuit and the first and second CPUs to enable the first and second CPUs to transmit the data.

BRIEF DESCRIPTION OF THE DRAWINGS

FIG. 3 is a block diagram for use in explanation of an internet telephone system to which the invention is applicable;

FIG. 4 is a schematic diagram for use in explanation of an internet telephone system to which the invention is applicable;

DESCRIPTION OF THE PREFERRED EMBODIMENTS

Embodiments of the invention are explained below with reference to the drawings. The present invention is applied to an internet telephone for transmitting audio data through the internet, and is especially suitable for use of internet telephones connected by PPP through public telephone networks.

FIG. 3 shows an internet telephone system to which the invention is applicable. In FIG. 3, a computer network NET1 is, for example, a computer network prepared by an internet service provider. The computer network NET1 contains a server S1 and a router R1.

The server S1 is connected to a public telephone network TEL1 through modems M1, M2, M3, . . . . Currently, data can be transmitted at the rate of 28.8 kbps through the public telephone network TELL by using a high-speed modem.

The computer network NET1 is connected to other computer networks forming the internet through the router R1. The router R1 routes data on the computer network to another computer network containing a destination terminal.

Terminals T1, T2, T3 . . . are those of individuals personally participating in the internet. Individual terminals T1, T2, T3, . . . may be personal computers installed with an internet telephone program or exclusive internet telephone sets. Exclusive internet telephone sets are terminals exclusive to internet telephones facilitating telephone communication using the internet as explained later.

The server S1 has a data base DB1. As shown in FIG. 4, the data base DB1 stores "terminal names", "internet names", "connection types", "public phone numbers for PPP", "users' names", and other information. The data base DB1 may be established using information obtained from contents of contracts concluded between the internet service provider and users. When the connection type is PPP, the data base DB1 contains telephone numbers for PPP of users contracting with the internet service provider by PPP connection.

Although the terminals T1, T2, T3, . . . are connected to the server S1 by PPP through the public telephone network in the above example, they may be connected through a digital network such as ISDN.

Next explained is a telephone call control in a telephone system to which the invention is applied. Assume here that a telephone call from the terminal T1 to the terminal T2 is desired in FIG. 3. The internet requires an IP address to specify a destination terminal. In this case, it is possible that the destination terminal T2 to be connected by PPP is not currently connected to the computer network NET1. Therefore, if the destination terminal T2 is out of connection with the computer network NET1, it cannot be accessed to by using an IP address. Thus, the data base DB1 is used.

Figure 1:
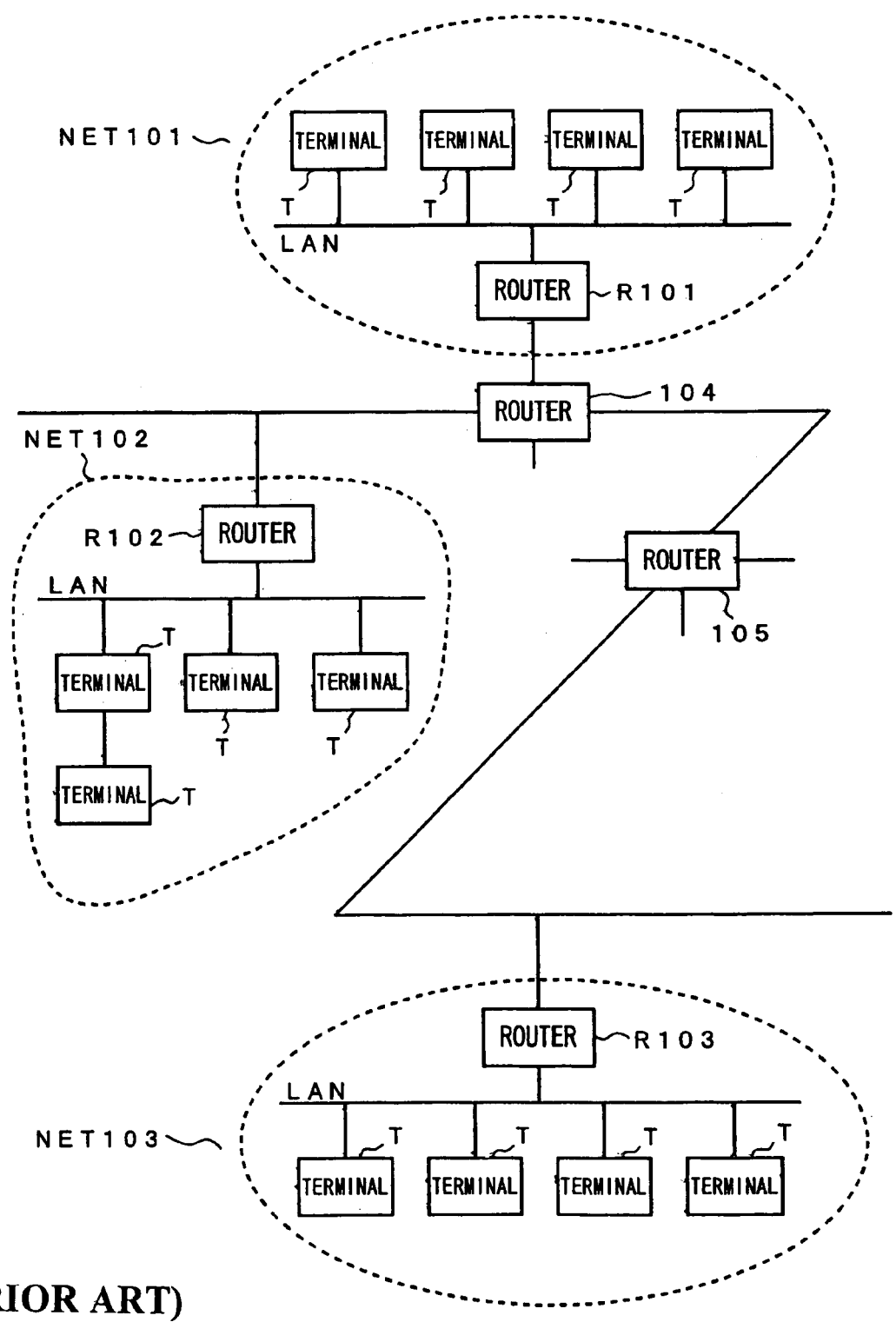
FIG. 1 is a block diagram for use in explanation of the internet.
Figure 2:
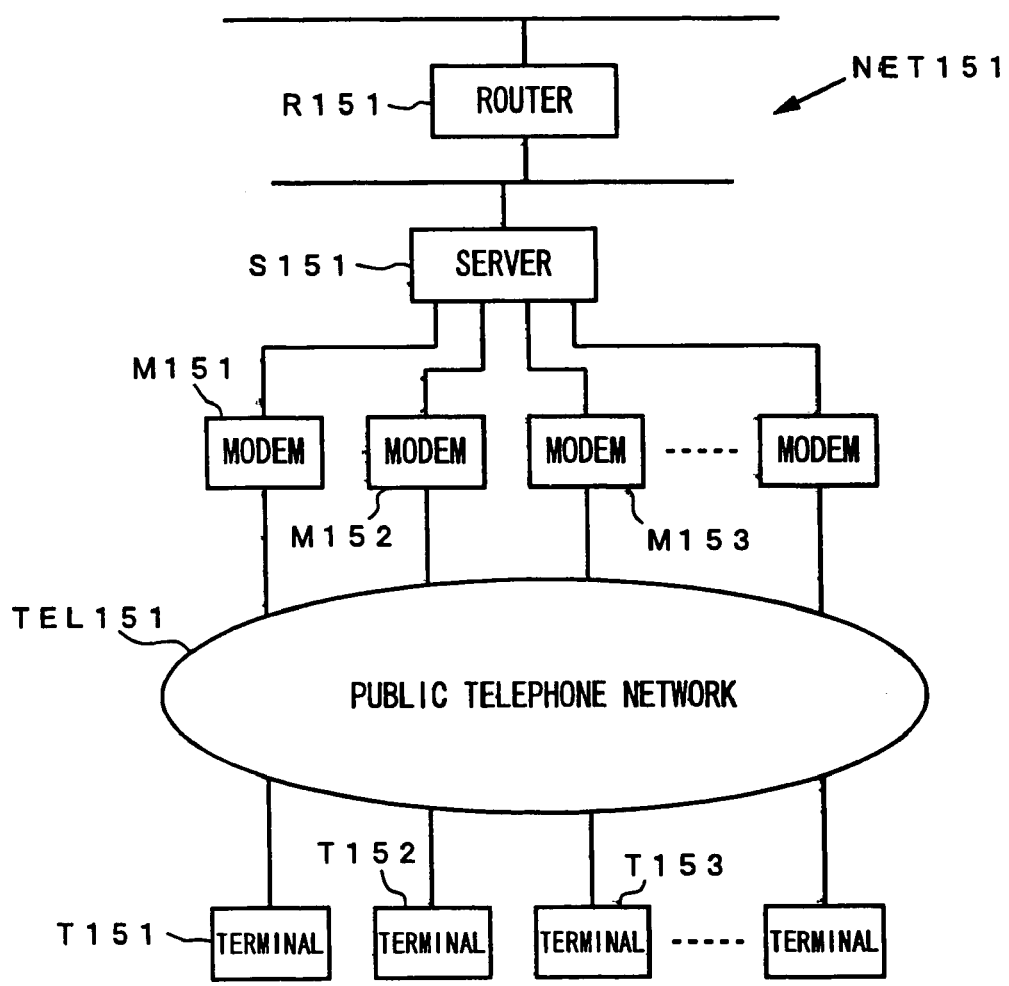
FIG. 2 is a block diagram for use in explanation of PPP connection.
Figure 5:
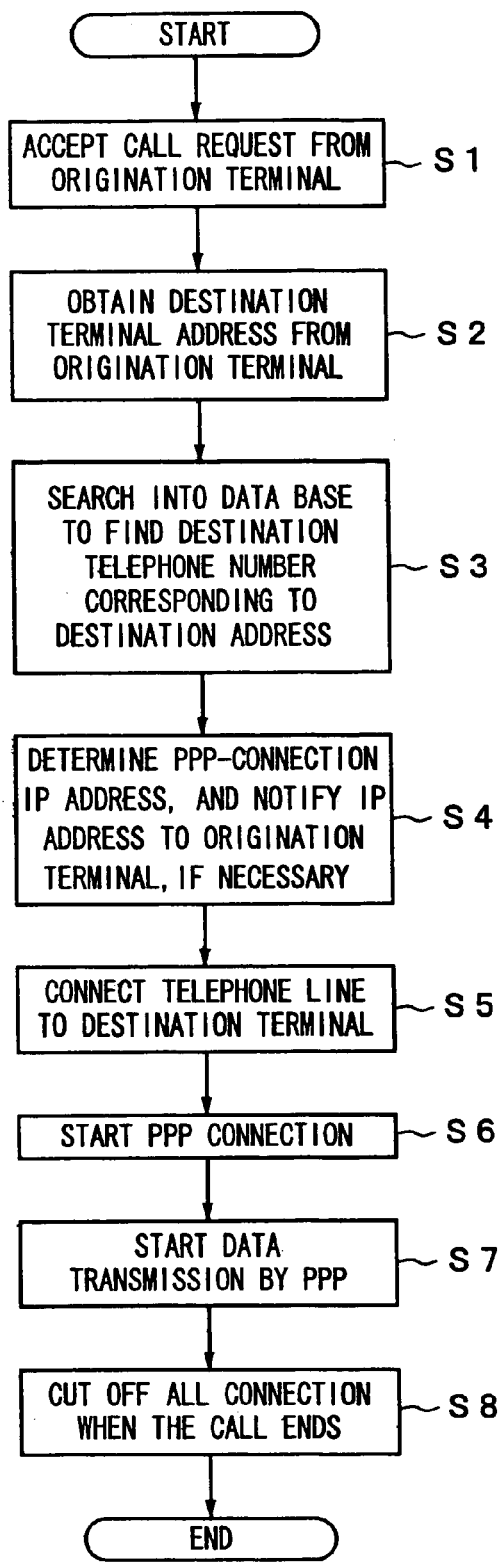
FIG. 5 is a flow chart for use in explanation of an internet telephone system to which the invention is applicable.

FIG. 5 is a flow chart showing the accessing process using the data base DB1. First, the source terminal T1 dials the computer network NET1 of the internet service provider to call up the server S1 of the computer network NET1. Responsively, the server S1 requests the terminal T1 to enter its account code and the password to authenticate whether the source terminal T1 is one of contractors of the internet service provider. The user of the source terminal T1 answers the request by entering its account code and the password. When the server S1 authenticates that the entered account code and password are those of a contractor, it assigns a temporary IP address to the terminal T1. Thus, PPP connection with the terminal T1 is started (step ST1).

After that, the terminal T1 designates a desired destination address (for example, terminal T2) (step ST2).

Responsively, the server S1 searches into the data base DB1 to find out information on the terminal T2 corresponding to the requested destination address. The telephone number of the terminal T2 for PPP connection can be known from information in the data base DB1 (step ST3).

The server S1 subsequently determines an IP address for specifying the destination terminal T2 within the server to prepare for PPP connection, and gives a notice on the destination terminal's IP address to the source terminal T1 (step ST4).

Then, the server S1 dials the telephone number of the terminal T2 found out from the data base DB1 to call up the terminal T2. When connection of the telephone line to the destination terminal T2 is confirmed, the server S1, after authentication, assigns the IP address to the destination terminal (step ST5).

PPP connection is thus started (step ST6). As a result, audio data is exchanged for communication between the terminals T1 and T2 (step ST7). The audio data is transmitted in a compressed form. For exchanging audio data, UDP is used as the protocol of the transport layer.

When the communication ends, all connection including PPP connection and telephone line connection between the terminal T1 and the server S1, those between the terminal T2 and the server S1 is disconnected (step ST8).

Although the above example is configured to determine the IP address of the terminal T2 prior to completing access to the terminal T2, the IP address of the terminal T2 may be determined after the access to the terminal T2 is completed. It is also possible to inform the source terminal T1 of the assigned IP address, if necessary. When the source terminal is informed of the IP address at the time when the server determines the IP address of the destination terminal, the source terminal can prepare for communication with the destination terminal such that the terminals can smoothly proceed to communication.

In this manner, the data base DB1 is provided which stores information on telephone number for PPP connection, and a destination terminal is accessed through the telephone number obtained from the data base DB1 when the destination terminal is a PPP-connected terminal (T2, for example). Then, the destination terminal T2 is connected to the server S1 by PPP. Therefore, even when the destination terminal is a PPP-connected terminal, the destination terminal can be called up for communication.

Figure 6:
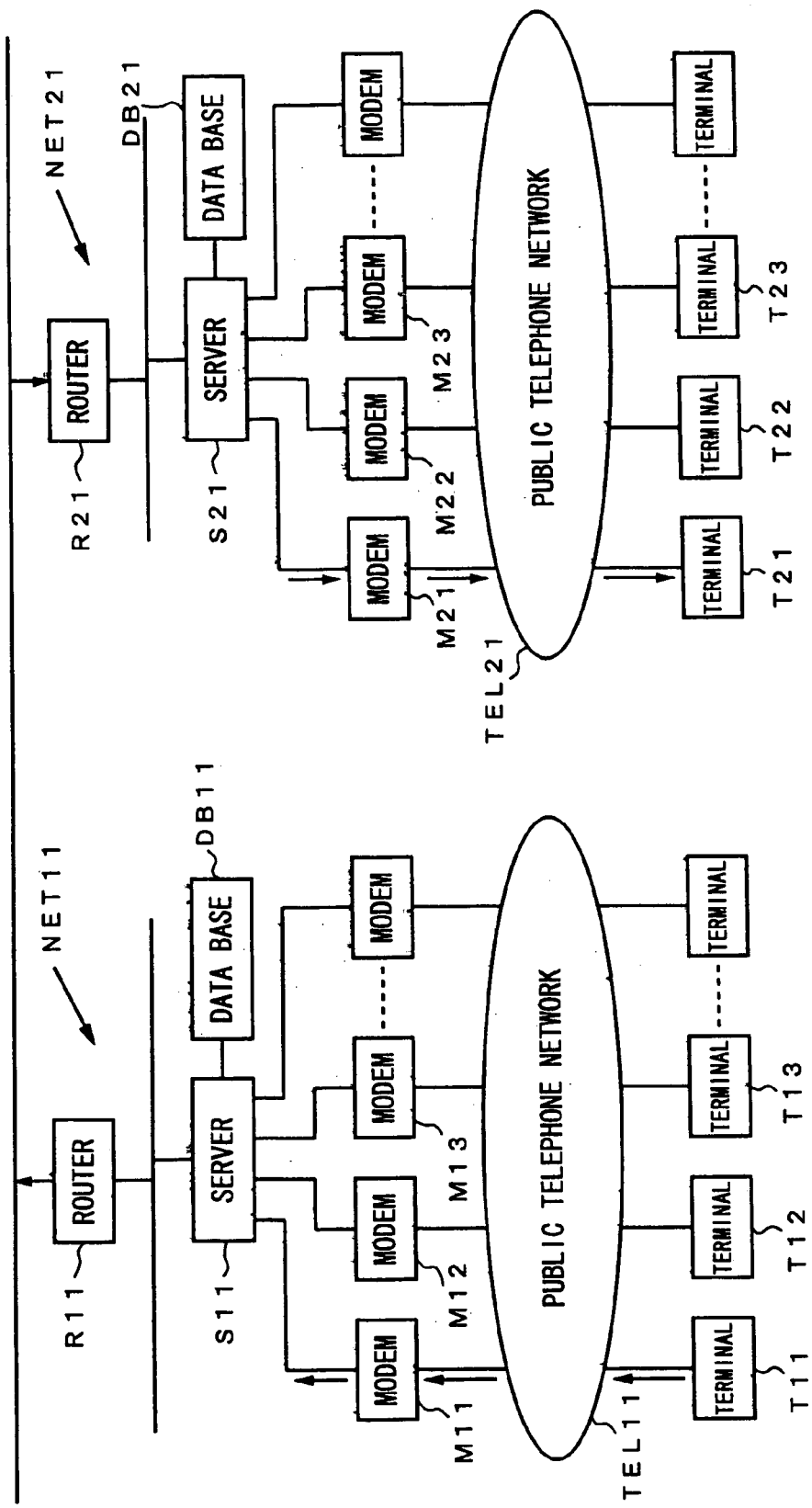
FIG. 6 is a block diagram for use in explanation of another internet telephone system to which the invention is applicable.

In the above example, a terminal is connected for communication with another terminal in a common computer network. However, a terminal in a computer network can be connected for communication also with a terminal in a different computer network. FIG. 6 shows an example where terminals in different computer networks are connected for communication.

In FIG. 6, a computer network NET11 is, for example, a computer network prepared by an internet service provider. The computer network NET11 contains a server S11 and a router R11. The server S11 is connected to a public telephone network TEL11 through modems M11, M12, M13, . . . .

The server S11 has a data base DB11. The data base DB11 stores information containing telephone numbers of terminals connected by PPP to the computer network NET11. The computer network NET11 is connected to other computer networks forming the internet through the router R11. The router R11 routes data on the computer network to an appropriate computer network containing a destination terminal. Terminals T11, T12, T13 . . . are those of individuals personally participating in the internet.

A computer network NET21 is, for example, a computer network prepared by another internet service provider. The computer network NET21 contains a server S21 and a router R21. The server S21 is connected to a public telephone network TEL21 through modems M21, M22, M23, . . . . The server S21 has a data base DB21. The data base DB21 stores information containing telephone numbers of terminals connected by PPP to the computer network NET21. The computer network NET21 is connected to other computer networks forming the internet through the router R21. The router R21 routes data on the computer network to an appropriate computer network containing a destination terminal. Terminals T21, T22, T23 . . . are those of individuals personally participating the internet.

Figure 7:
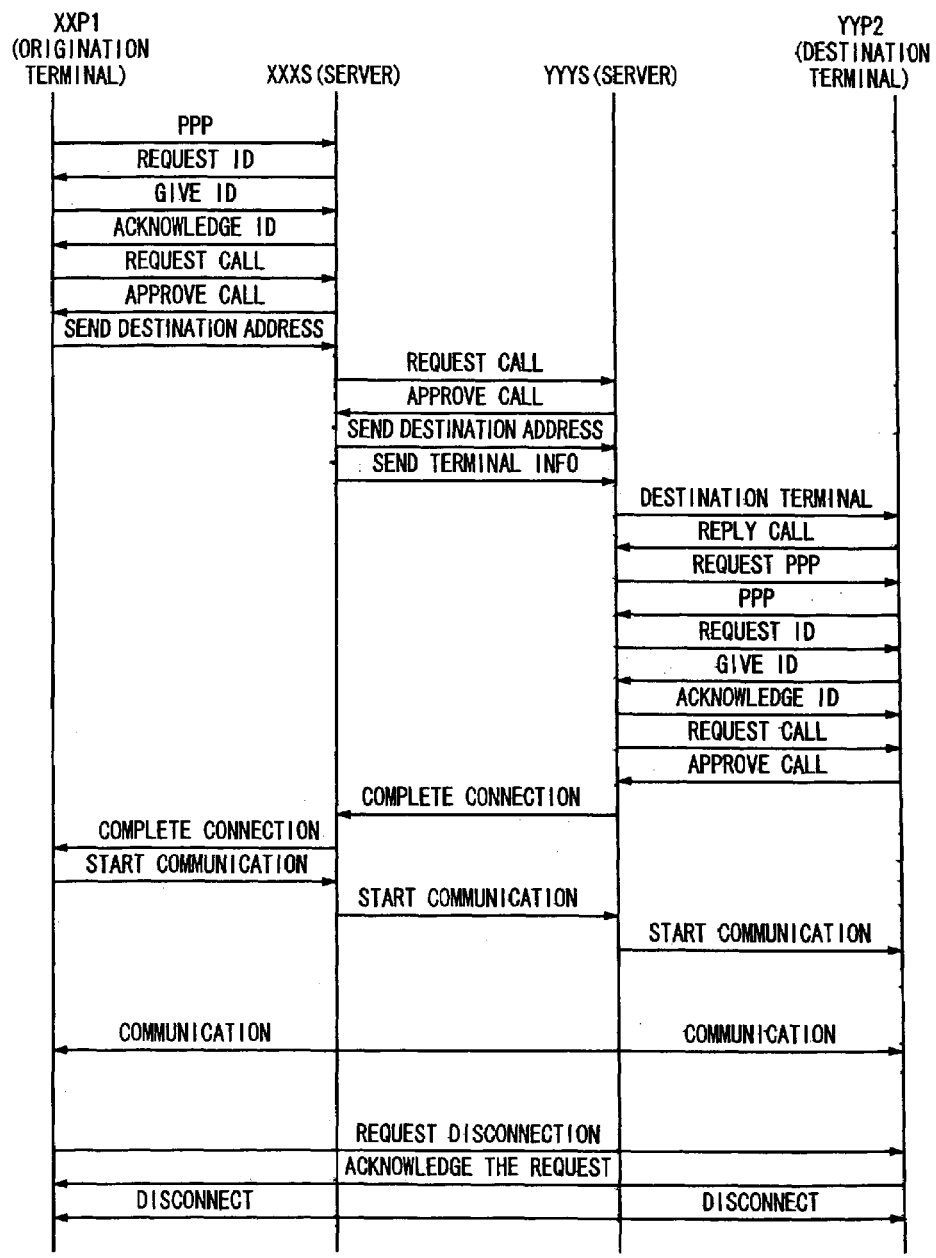
FIG. 7 is a flow chart for use in explanation of another internet telephone system to which the invention is applicable.

Assume here that the terminal T11 desires a telephone call to the terminal T12. In this case, a process is progressed as shown in FIG. 7.

First, the source terminal T11 dials the computer network NET11 of the internet service provider to call up the server S11 of the computer network NET11. Responsively, the server S11 requests the terminal T11 to enter its account code and the password for authentication whether the source terminal T11 is one of contractors of the internet service provider.

The user of the source terminal T11 answers the authentication request by entering its account code and the password. When the server S11 confirms that the entered account code and password are those of a contractor, it assigns a temporary IP address to the terminal T11. Thus, PPP connection of the terminal T11 is started.

After that, the terminal T11 sends a call request to the server S11, and the server S11 sends back a call approval. In receipt of the call approval, the terminal T11 gives a desired destination address (terminal T21, for example).

The server S11 connected to the source terminal in receipt of the destination address sends a call request for communication with the terminal T21, for example, to the server S21 of the computer network (NET21, for example) containing the destination terminal. In receipt of the call request for communication with the terminal 21, the server S21 sends back a call approval to the server S11. In receipt of the call approval, the server S11 of the network NET11 containing the source terminal sends the destination address and information on the source terminal.

The server S21 of the computer network NET21 containing the destination terminal searches into the data base DB21 to find out information on the terminal T21. The telephone number of the terminal T21 for PPP connection can be known from information of the data base DB21. The server S21 of the computer network NET21 dials the telephone number of the terminal T21 obtained from the data base DB21 to call up the terminal T21.

The destination terminal T21 accessed by the server S21 sends back an acknowledgement. The server S21 in receipt of the acknowledgement requests PPP connection, and the terminal T21 in receipt of the request for PPP connection gives confirmation of PPP connection.

The server S21 then request entry of the account code and the password for authentication. In response to the authentication, the user of the destination terminal enters the account code and the password. When the entered account code and password are confirmed to be those of a proper contractor, an IP address is assigned to the terminal T21. Thus, PPP connection of the terminal T21 is started.

When the PPP connection is started, a call request is sent from the server S21 to the terminal T21, and a call approval is sent back from the terminal T21 to the server S21. Then, the server S21 of the computer network NET21 sends a call connection completion notice to the server S11 of the computer network NET11, and the server S11 sends a call connection completion notice to the terminal T11. As a result, audio data is exchanged for communication between the terminals T11 and T21.

When a disconnection request is issued from the source terminal T11, for example, after the communication ends, the disconnection request is sent to the destination terminal T21. In receipt of the disconnection request, the terminal T21 sends back a disconnection agreement to the terminal T11, and all connection is disconnected.

For using an internet telephone by PPP connection, a personal computer is prepared in most cases. Such a personal computer needs connection of a microphone and a speaker and needs installation of appropriate software for connection to the internet. It is difficult for users unfamiliar to computers to set a personal computer ready for connection to the internet. Moreover, a computer connected by PPP for use as an internet telephone is difficult to operate and is expensive.

To avoid this problem, an exclusive internet telephone apparatus is used as a terminal. The internet telephone apparatus does not need installation of software for connection to the internet, and can be easily connected to the internet for audio communication.

Figure 8:
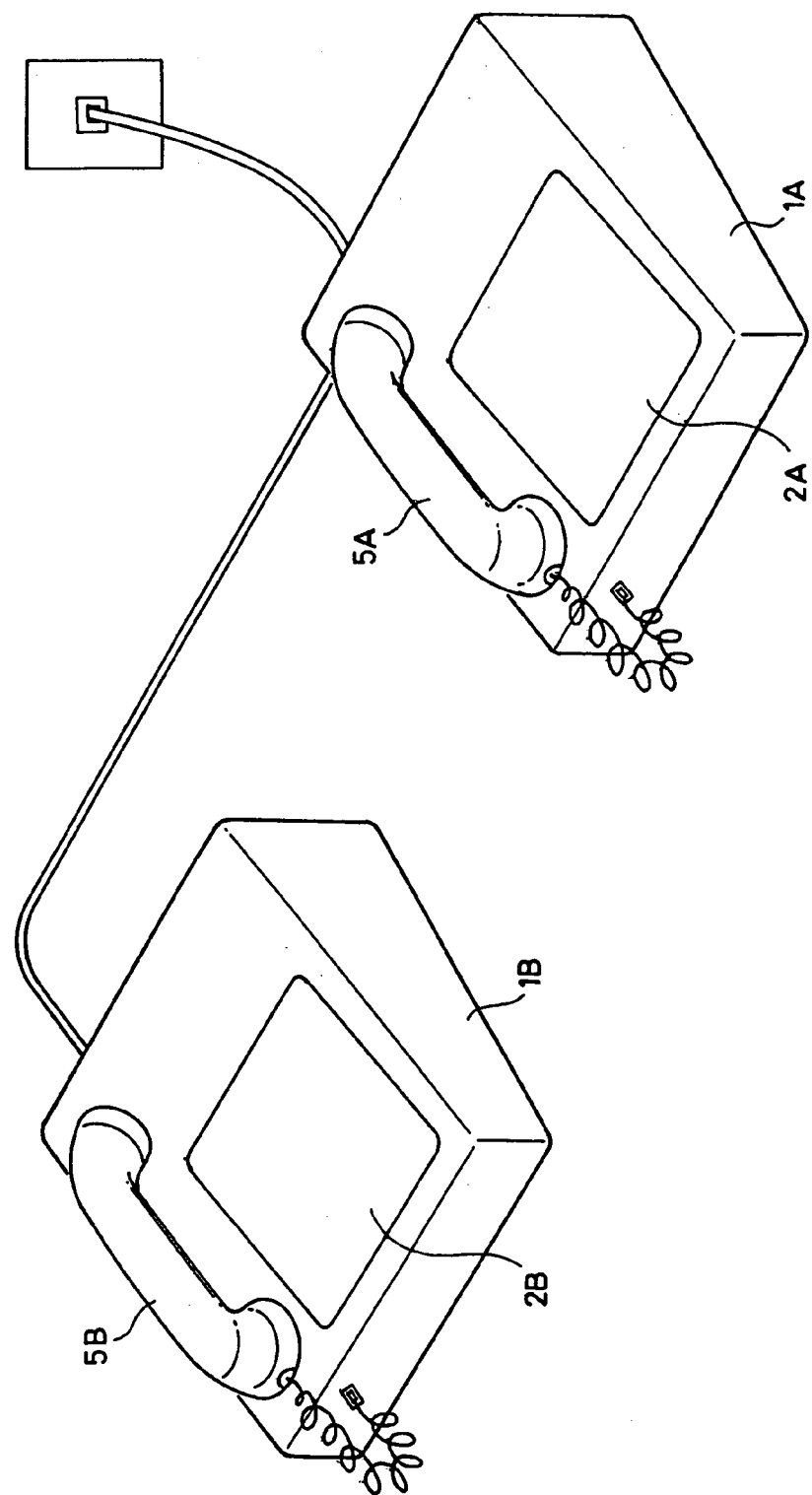
FIG. 8 is a perspective view of a telephone set in an internet telephone system to which the invention is applied.

FIG. 8 shows such a terminal of an internet telephone apparatus. The telephone apparatus to which the invention is applied uses two main telephone sets 1A and 1B and can effect two independent telephone calls of different routes through a single telephone line.

In FIG. 8, numerals 1A and 1B denote main telephone bodies that are connected to each other. The main telephone body 1A is connected to a public telephone circuit.

Figures 9, 11:
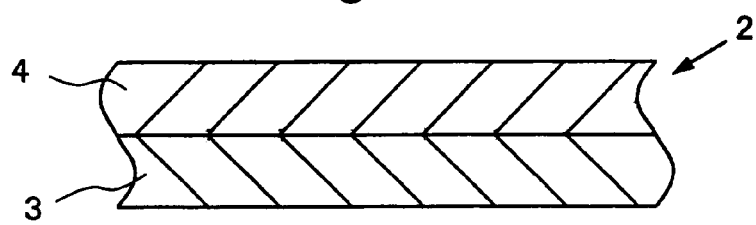
FIG. 9 is a cross-sectional view for use in explanation of a telephone set in an internet telephone system to which the invention is applied.
FIG. 11 is a schematic diagram of a telephone set in an internet telephone system to which the invention is applied.

The main telephone bodies 1A and 1B have display/operators 2A and 2B on their upper surfaces. The display/operators 2A and 2B are multi-layered panels each including a touch panel 4 stacked on a display panel 3 as shown in FIG. 9. The display/operators 2 display icons of numerical keys, operational keys, and so forth, which permit a user to enter a desired instruction by pressing the touch panel 4 at the portion of a corresponding icon. The display/operators 2A and 2B also display help messages explaining how to operate the keys and the current modes of setting in addition to key icons, etc. Other various information is also displayed on the display/operators 2A and 2B. Handsets 5A and 5B are connected to the main telephone bodies 1A and 1B.

As referred to above, the internet telephone apparatus to which the invention is applied can effect independent telephone calls of two routes using the telephone sets 1A and 1B.

More specifically, if data is transmitted via a modem through a normal telephone line, the maximum data transmission rate is currently 28.8 kbps. As to audio data, however, its transmission rate ranges from 8 kbps to 64 kbps, depending on compression systems. To ensure an acceptable quality of sound, audio data must be sent at the rate of 8 kbps to 14 kbps minimum.

Even if a terminal selects a compression system in which the transmission rate of audio data is 12 kbps and transmits data at the rate of 28.8 kbps through a public telephone circuit, the data rate on the circuit increases to 16 kbps, approximately, because asynchronous serial transmission is employed and an overhead for PPP connection is added. However, since the circuit having the rate of 28.8 kbps leaves a margin, it is possible to send data at the transmission rate of 12 kbps approximately. Therefore, taking the overhead attached to the data for communication into account, it is still possible to transmit additional audio data of about 8 kbps. This means that additional compressed audio data can be put onto the circuit in addition to the audio signal of the telephone call. Therefore, when the quality of sound is not of much importance, data of two telephone calls can be put onto the telephone line. If a digital circuit such as ISDN is used, more telephone calls can be made without deteriorating the quality of sound.

As explained above, a plurality of telephone sets 1A and 1B can be operated independently through a single line. As its other applications, telephone communication by three persons and interrupt function can be used conveniently. For example a, one-to-two call from two main telephone sets 1A and 1B to a single destination is made possible. If desired, the one-to-two talk can be changed to one-to-one call choosing one of the telephone sets 1A and 1B. It is also possible to deliver a telephone call from the telephone set 1A to the telephone set 1B, or vice versa. When any interrupt occurs to the telephone set 1A, the new call can be delivered to and continued by the telephone set 1B.

Figure 10:
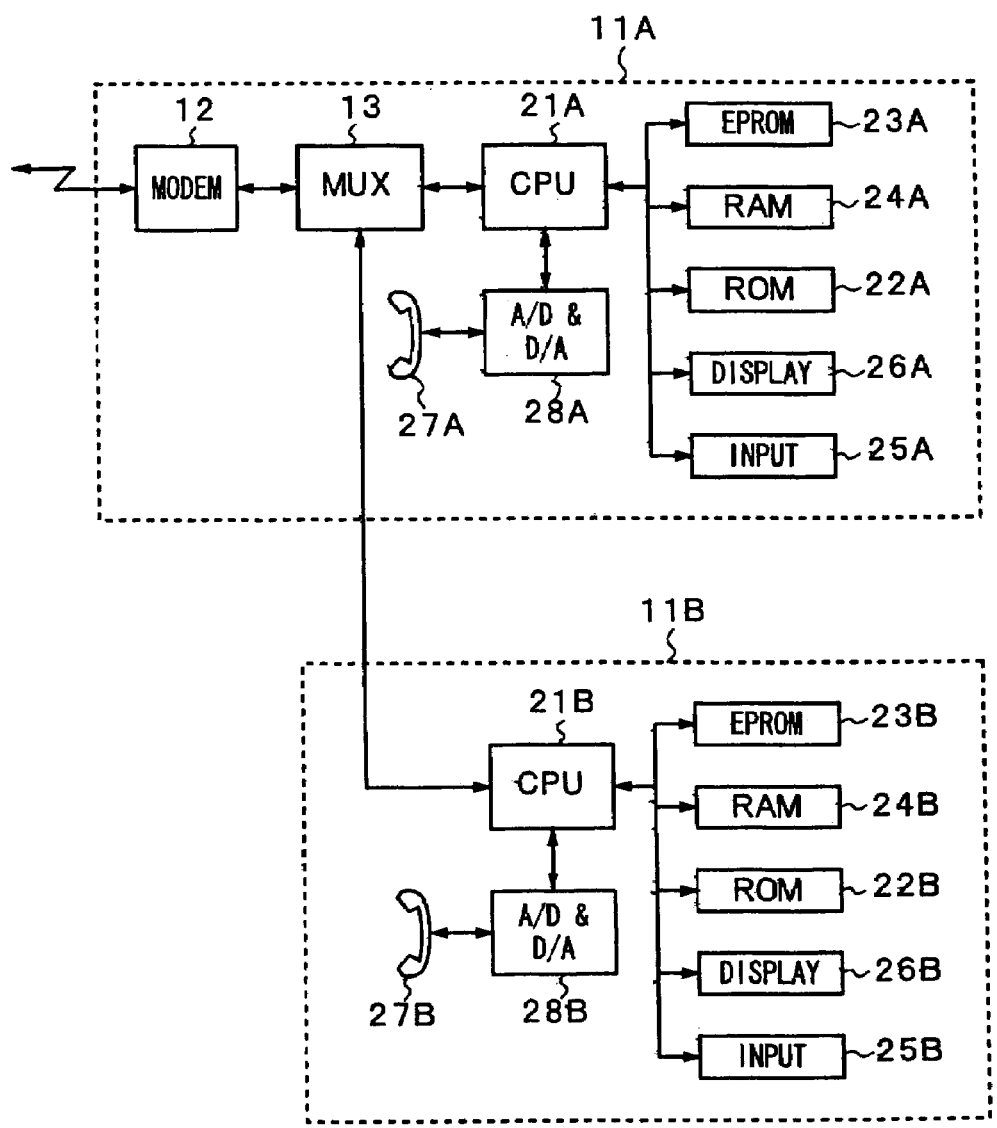
FIG. 10 is a block diagram of a telephone set in an internet telephone system to which the invention is applied.

FIG. 10 shows such an internet telephone set. In this example, telephone sets 11A and 11B are operative as independent terminals such that data of two calls can be transmitted through a single public telephone line.

In FIG. 10, the telephone set 11A has a multiplexing circuit 13 for transmitting audio data of two routes through a single telephone line, and a model 12. The modem 12 is connected to a public telephone circuit.

The telephone set 11A also has a CPU 21A. Connected to the CPU 21A are ROM 22A, EPROM 23A and RAM 24A. Input from a touch panel 25A is given to CPU 21A, and output from CPU 21A is displayed on a display panel 26A. CPU 21A executes dial connection processing, data transfer processing by IP, and processing for compression and expansion of audio signals. A handset 27A is connected to the telephone set 11A. Voice from the handset 27A is digitalized by an A/D and D/A converter 28A. Audio data to the handset 27A is returned to the analog form by the A/D and D/A converter 28A.

The telephone set 11B has a CPU 21B. CPU 21B of the telephone set 11B is connected to the multiplexing circuit 13 of the telephone set 11A. Connected to the CPU 21B are ROM 22B, EPROM 23B and RAM 24B. Input from a touch panel 25B is given to CPU 21B, and output from CPU 21B is displayed on a display panel 26B. CPU 21B executes dial connection processing, data transfer processing by IP, and processing for compression and expansion of audio signals. A handset 27B is connected to the telephone set 11B. Voice from the handset 27B is converted into a digital form by an A/D and D/A converter 28B. Audio data to the handset 27B is returned to the analog form by the A/D and D/A converter 28B.

FIG. 11 shows contents of a data packet for putting audio data onto a circuit. In this example, a preamble and a post-amble are added to opposite ends of an audio data. The preamble contains the IP address of a destination terminal and the IP address of a source terminal. The preamble also contains a port number. The post-amble contains data for detecting and correcting data error.

The IP address contained in data from a server is recognized by the multiplexing circuit 13. The IP address is a unique code for identifying a terminal on a network as explained before. When a server and a terminal are connected by dial PPP, the IP address is given every time when such connection is started.

In this example, the telephone sets 11A and 11B operate as independent terminals. That is, when a telephone call is made using the telephone set 11A in FIG. 10, authentication is done between the telephone set 11A and the server. If the authentication is affirmative, then an IP address is assigned to the telephone set 11A, and the telephone set 11A is PPP-connected to the server. As a result, the call from the telephone set 11A is made possible.

When a telephone call is made using the telephone set 11B, authentication is done between the telephone set 11B and the server. If the authentication is affirmative, then an IP address is assigned to the telephone set 11B, and the telephone set 11B is PPP-connected to the server. As a result, the call from the telephone set 11B is made possible.

In the above example, the telephone sets 11A and 11B operate as independent terminals. Therefore, two independent telephone calls using a single telephone line can be made. In this example, although the server can communicates with a destination terminal specified by the IP address, data separation and multiplexing by hardware or software are required also on the part of the server because data of two telephone calls are put on a single line. Moreover, when two telephone sets 11A and 11B are used simultaneously, two IP address must be assigned to a single line.

Figure 12:
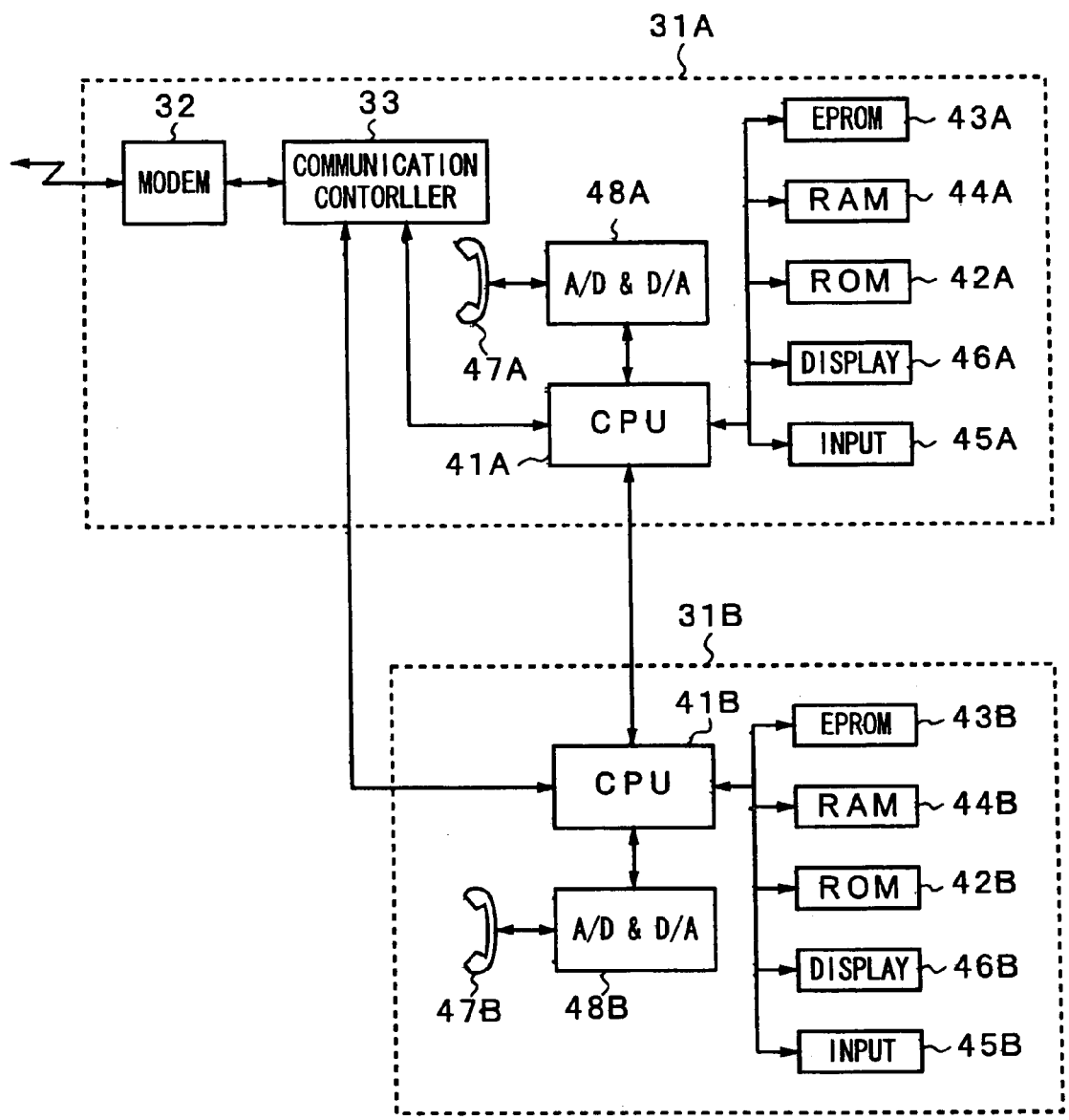
FIG. 12 is a block diagram of another telephone set in an internet telephone system to which the invention is applied.

FIG. 12 shows another telephone set. This example enables two independent telephone calls using a single IP address.

In FIG. 12, numerals 31A and 31B denote telephone sets. The telephone set 31A has a communication controller 33 and a modem 32. The communication controller 33 executes dial connection processing, data transfer processing by IP, and controls communication to permit two telephone sets 31A and 31B to send and receive audio data, respectively, by using identifying information. The identifying information may be port numbers or other appropriate materials. The modem 37 is connected to a public telephone line.

The telephone set 31A also has a CPU 41A. Connected to the CPU 41A are ROM 42A, EPROM 43A and RAM 44A. Input from a touch panel 45A is given to CPU 41A, and output from CPU 41A is displayed on a display panel 46A. CPU 41A controls the entirety of the telephone set 31A, and executes processing for compression and expansion of audio signals. An A/D and D/A converter 48A converts audio signals from a digital form into an analog form, or vice versa. A handset 47A is connected to the telephone set 41A.

When a telephone call is done, authentication is made by the communication controller 33 with the server. If the authentication is affirmative, then an IP address is assigned to the communication controller 33, and the communication controller 33 is PPP-connected to the server. Audio data is sent in form of the above-explained packets, and the communication controller 33 composes or decomposes these packets.

In this example, it is necessary to separate audio data of two routes for telephone sets 31A and 31B, which are sent in parallel. To cope with this, identifying information is added to distinguish data for communication through the telephone set 31A from data for communication through the telephone set 31B.

Port numbers, for example, may be used as such identifying information. The internet uses the TCP or UDP protocol for data transmission. In these protocols, a number called port number is added to each communication application. Such a port number is added as a part of the preamble of the packet data shown in FIG. 11. Port numbers make it possible to distinguish audio data for communication with the telephone set 31A from audio data for communication with the telephone set 31B.

In receipt of data, the communication controller 33 identifies from its port number whichever telephone set the data should be directed to, and transfers the data to the telephone set 31A or 31B. On the other hand, when the communication controller 33 receives data from the telephone set 31A or 31B, it writes a corresponding port number in each packet when it processes the data into packets, so as to give information whichever telephone set the data comes from.

Other materials may be used as identifying information in lieu of port numbers used in the above example. For example, identifying information may be added to data adjacent to the preamble.

According to the invention, a plurality of independent telephone calls can be made through a single line. This contributes to efficient use of telephone lines, and permits users to utilize telephone conversation by three persons, interrupt calls, delivery of a call from a telephone set to another, and so forth. Moreover, by distinguishing data for a telephone set from data for another among a plurality of telephone sets by attaching identifying information, the invention enables a plurality of independent calls using a single line without assigning a plurality of IP addresses.

What is claimed is:

1. A telephone apparatus for connection to a computer network through a telephone network to establish telephone calls via a server of the computer network, said telephone apparatus comprising:
a first telephone set including:
a first audio input/output means for converting input voice into a first digital audio signal and for converting an input first digital audio signal into output voice, and
a first CPU that executes processing for connecting said first telephone set of said server and selectively compressing or expanding said first digital audio signal into first audio data;
a second telephone set including:
a second audio input/output means for converting input voice into a second digital audio signal and for converting an input second digital audio signal into output voice,
a second CPU that executes processing for connecting said second telephone set to said server and processing for selectively compressing or expanding said second digital audio signal into second audio data,
a modem for connecting to a single telephone line of said telephone network, and
connection control means connected between said modem and said first CPU and said second CPU to enable said first CPU to transmit and receive said first audio data via said server and said second CPU to transmit and receive said second audio data via said server, wherein said first audio data of said first telephone set and said second audio data of said second telephone set are formed as data packets including address data for communicating with said first CPU of said first telephone set and said second CPU of said second telephone set, wherein said server assigns a first address to said first telephone set and a second address to said second telephone set as said address data, and wherein said data packets include said first and second addresses in addition to said first audio data and said second audio data, and said connection control means recognizes said first and second addresses to deliver said data packets to one of said first CPU and said second CPU in response to said first and second addresses.

2. A telephone apparatus for connection to a computer network through a telephone network to establish telephone calls via a server of the computer network, said telephone apparatus comprising:
a first telephone set including:
a first audio input/output means for converting input voice into a first digital audio signal and for converting an input first digital audio signal into output voice, and a first CPU that executes processing for connecting said first telephone set to said server and selectively compressing or expanding said first digital audio signal into first audio data;

a second telephone set including:

a second audio input/output means for converting input voice into a second digital audio signal and for converting an input second digital audio signal into output voice, a second CPU that executes processing for connecting said second telephone set to said server and processing for selectively compressing or expanding said second digital audio signal into second audio data, a modem for connecting to a single telephone line of said telephone network, and connection control means connected between said modem and said first CPU and said second CPU to enable said first CPU to transmit and receive said first audio data via said server and said second CPU to transmit and receive said second audio data via said server, wherein said first audio data of said first telephone set and said second audio data of said second telephone set are formed as data packets including address data for communicating with said first CPU of said first telephone set and said second CPU of said second telephone set, wherein said server assigns an address to said connection control means as said address data, and wherein said data packets include first and second identifying numbers in addition to said first audio data and said second audio data to distinguish data for said first CPU from data for said second CPU, and said connection control means recognizes said first and second identifying numbers to deliver said data packets to one of said first CPU and said second CPU in response to a respective one of said first and second identifying numbers.

* * * * *